Patented June 13, 1933

1,913,943

UNITED STATES PATENT OFFICE

JOHN D. MORGAN, OF SOUTH ORANGE, NEW JERSEY, ASSIGNOR TO DOHERTY RESEARCH COMPANY, OF NEW YORK, N. Y., A CORPORATION OF DELAWARE

MANUFACTURE OF HIGH ALUMINA CEMENT

No Drawing.   Application filed September 1, 1931.   Serial No. 560,677.

The present invention relates to the manufacture of cement, and more particularly to an improved calcium aluminate cement and process of making same.

The primary object of the present invention is to provide an improved calcium aluminate cement having desirable cementing properties and yielding hydrated products of strength under tensile strains much greater than any comparable cement now on the market.

A further object of the present invention is to provide a commercially practicable and economical process for making calcium aluminate cement of improved and uniform properties.

With the above and other objects and features in view the invention consists in the improved calcium aluminate cement and process of making same, more particularly hereinafter described and defined in the accompanying claim.

There are four well known calcium aluminates, namely:

$(CaO)_3.Al_2O_3$; $(CaO)_5.(Al_2O_3)_3$; $CaO.Al_2O_3$; and $(CaO)_3.(Al_2O_3)_5$.

These are all cements but of different cementing properties. Some set so rapidly as to be worthless from a commercial viewpoint. Others are very slow in setting. The improved calcium aluminate cement which forms the subject of the present invention comprises a mixture of the above-named calcium aluminates of uniform composition and optimum setting and cementing characteristics. This improved calcium aluminate cement has a specific gravity of 3.10 to 3.20, and as placed on the market is pulverized so as to preferably pass a 200 mesh screen. In terms of its components this new cement contains approximately equal proportions by weight of $Al_2O_3$ and $CaO$, and approximately 6 to 10% each of silica and $Fe_2O_3$. In its preferred form the chemical composition of the cement is maintained uniformly within the following narrow range, namely 37½ to 41½% ------------------ $Al_2O_3$
41   to 44½% ------------------ $CaO$
7½ to 8½% ------------------ $SiO_2$; and
6   to 11%  ------------------ $Fe_2O_3$.

An important feature of the present invention is that of maintaining the composition of the improved cement uniform within the above specified preferred range. If the silica content of the cement is allowed to go above approximately 10% by weight there is a tendency to form ortho-silicate of lime or the ternary compound $(CaO)_2SiO_2.(Al_2O_3)_3$, which has a serious adverse effect on the cementing properties of the resulting product. An excess of iron oxide over and above the 11% limit specified for the optimum cement composition results in a cement of greatly reduced cementing value and low tensile strength in its hydrated products. On the other hand a deficiency of iron oxide below 5% has a serious adverse effect on the process of manufacture and induces formation of aluminum carbide, thereby seriously lowering the tensile strength of the hydrated products.

In manufacturing the improved cement forming the subject of the present invention, apparatus may be employed of the type described in my co-pending application Serial Number 530,796 for "Reduction furnace", filed April 17, 1931.

The process of manufacture as carried out in the apparatus of the aforementioned co-pending application is substantially as follows: A charge consisting, for example, of approximately 44.3% of bauxite by weight; 47% of limestone and 4.4% of iron oxide is first ground to a fineness ranging from 10 to 60 mesh, and is then briqueted by thorough bonding with 4.2% by weight of a hydrated lime made up with approximately 1.11 gallons of water. The composition of this charge is predetermined to yield a cement product within the optimum composition range previously specified, and any shortage of silica and iron content in the bauxite and limestone charge is made up by addition of sand and iron ore to the raw charge. After molding the briquets in a hydraulic press they are dried by baking at a temperature of approximately 280° F., and are then fed into an inclined gas fired furnace having a hearth sloping preferably enough so that the briquet charge is fed by gravity over the hearth. After heating the briquets in the inclined furnace for a sufficient period to complete dissociation of the carbonates and elimination of the chemical water of composition, the briquets are preferably discharged from the inclined hearth furnace into a high temperature melting furnace wherein they are heated to a temperature above the fusion temperature of all the components of the briquet, namely to a temperature of about 2850° F. The temperature in the so-called sloping hearth furnace is preferably maintained below the melting or sintering point of the briquet material, namely at or slightly below 2500° F. Economical operation is obtained by firing the sloping hearth furnace with a liquid or gaseous fuel, while employing electric current in the form of electric arcs for heating the high temperature electric furnace.

Heating of the charge in the high temperature furnace is continued for a period sufficient to effect thorough fusion and complete combination reactions between the lime and the alumina, iron oxide and silica. The molten calcium aluminate cement thus formed is then tapped off, preferably into molding equipment of the pig casting type, and is allowed to cool gradually within these molds. The optimum shape of the cooling molds is a square so as to give minimum surface exposure with maximum capacity. The gradual cooling of the molten cement is a very important feature of the process, because it is only by gradual cooling over a period of four to five hours that a product of suitable crystalline structure and hydrating qualities is obtained. The cement after proper slow cooling has a dull stony appearance, whereas if the molten cement is allowed to cool rapidly, a glassy non-crystalline product is formed which has no substantial hydrating properties or cementing value. The last step in the process of manufacture is that of pulverizing the cement to a fineness of at least 200 mesh, and preferably even 250 mesh. As an alternative to the pulverizing of the cement by slow grinding, it has been found that gradual very slow cooling of the liquid cement to a transition temperature of approximately 600° F. normally results in the swelling and disintegration of the product to such an extent that approximately 80% of the thus disintegrated material will pass a 200 mesh screen, so that the only pulverizing expense involved is that of grinding the balance of the material to pass a 200 to 250 mesh screen.

Following are the results of tests showing some of the properties of the improved calcium aluminate cement forming the subject of this invention:

A cement of the preferred composition was mixed neet with 29% of water and allowed to set. The period of initial set was 3 hours and 10 minutes, and the final set 4 hours and 10 minutes. A test block of this neet cement after setting 24 hours had a tensile strength of 430 lbs. per square inch, and after setting 72 hours another block was found to have a tensile strength of 680 lbs. per square inch. Another test block made up of one part of the improved cement and 3 parts of Ottawa sand after being allowed to set for 24 hours exhibited a tensile strength of 450 lbs. per square inch, whereas a corresponding test block of Portland cement prepared under like conditions had a tensile strength of only 120 lbs. per square inch. The present improved cement closely resembles in color the standard grade of Portland cement, but has much more advantageous cementing and setting characteristics.

The invention having been thus described, what is claimed as new is:

In the manufacture of calcium aluminate cement, the steps comprising forming a mixture of finely ground alumina clay, limestone, silica and iron oxide in proportions to yield a cement having the composition $37\frac{1}{2}$ to $41\frac{1}{2}$ percent $Al_2O_3$, 41 to $44\frac{1}{2}$ percent $CaO$, $7\frac{1}{2}$ to $8\frac{1}{2}$ per cent $SiO_2$, and 6 to 11 percent $Fe_2O_3$, heating the mixture to a temperature below the sintering point and thereby dissociating carbonates and driving off water of combination, further heating the mixture to a high fusion temperature of about 2850° F. and thereby forming calcium aluminate slag of the desired composition, gradually cooling the finished cement over a period of four to five hours, and pulverizing the stony product thereby obtained to a fineness of at least 200 mesh.

In testimony whereof I affix my signature.

JOHN D. MORGAN.